(12) United States Patent
Steinbrecher et al.

(10) Patent No.: US 8,538,598 B2
(45) Date of Patent: Sep. 17, 2013

(54) POWER AND THERMAL OPTIMIZATION OF PROCESSOR AND COOLING

(75) Inventors: Robin A. Steinbrecher, Olympia, WA (US); Sandeep Ahuja, University Place, WA (US); Casey R. Winkel, Tumwater, WA (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 12/977,342

(22) Filed: Dec. 23, 2010

(65) Prior Publication Data

US 2012/0166015 A1 Jun. 28, 2012

(51) Int. Cl.
| | |
|---|---|
| *G05D 23/00* | (2006.01) |
| *G01R 19/00* | (2006.01) |
| *G01K 1/08* | (2006.01) |
| *G01K 17/00* | (2006.01) |
| *G06F 1/26* | (2006.01) |
| *G06F 1/32* | (2006.01) |
| *G06F 1/00* | (2006.01) |
| *G06F 11/30* | (2006.01) |

(52) U.S. Cl.
USPC ............. 700/300; 702/64; 702/132; 702/136; 713/320; 713/340

(58) Field of Classification Search
USPC ............... 700/299, 300; 702/57, 64, 65, 127, 702/130, 132, 136; 713/300, 320, 340; 327/538, 540
See application file for complete search history.

(56) References Cited

U.S. PATENT DOCUMENTS

| | | | |
|---|---|---|---|
| 6,058,012 A * | 5/2000 | Cooper et al. | 361/704 |
| 6,191,546 B1 * | 2/2001 | Bausch et al. | 318/471 |
| 6,348,777 B1 * | 2/2002 | Brown et al. | 320/160 |
| 7,089,088 B2 * | 8/2006 | Terry et al. | 700/276 |
| 7,196,863 B2 | 3/2007 | Sakamoto | |
| 7,343,505 B2 * | 3/2008 | Chotoku et al. | 713/340 |
| 7,533,283 B2 * | 5/2009 | Fung | 713/322 |
| 7,698,583 B2 * | 4/2010 | Gaskins et al. | 713/300 |
| 8,169,764 B2 * | 5/2012 | Takayanagi et al. | 361/103 |
| 2002/0138159 A1 | 9/2002 | Atkinson | |
| 2006/0146086 A1 * | 7/2006 | Ou et al. | 347/17 |
| 2007/0001694 A1 | 1/2007 | Jahagirdar et al. | |
| 2007/0045825 A1 | 3/2007 | Chan et al. | |
| 2008/0028778 A1 * | 2/2008 | Millet | 62/129 |
| 2010/0030500 A1 * | 2/2010 | Refai-Ahmed et al. | 702/64 |
| 2010/0161303 A1 * | 6/2010 | McGowan et al. | 703/13 |
| 2011/0291746 A1 * | 12/2011 | Ibrahim et al. | 327/538 |

FOREIGN PATENT DOCUMENTS

| | | |
|---|---|---|
| WO | 2012/087985 A2 | 6/2012 |
| WO | 2012/087985 A3 | 8/2012 |

OTHER PUBLICATIONS

International Search Report and Written Opinion received for PCT Patent Application No. PCT/US2011/065942, mailed on Jun. 28, 2012, 9 pages.

\* cited by examiner

*Primary Examiner* — Crystal J Barnes-Bullock

(74) *Attorney, Agent, or Firm* — International IP Law Group, P.L.L.C.

(57) ABSTRACT

In some embodiments a processor is adapted to store a relationship of power as a function of temperature and voltage, wherein the stored relationship data is to be used for managing power in a system including the processor. Other embodiments are described and claimed.

19 Claims, 4 Drawing Sheets

POWER AND THERMAL OPTIMIZATION OF PROCESSOR AND COOLING

TECHNICAL FIELD

The inventions generally relate to system power and thermal optimization of processor and cooling.

BACKGROUND

There are two main contributors to power increase in server and other computer systems as a result of increased temperature. As temperatures increase, fans increase in speed to maintain components within their specifications. Additionally, as processor die temperatures increase, processor leakage increases. For purposes of minimizing the power requirements of such a system, the platform can be enabled to set optimal fan speeds. Additionally, the processor can provide the optimal temperature at which to operate the processor to minimize its power consumption. However, current systems do not enable such optimization for an individual processor.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
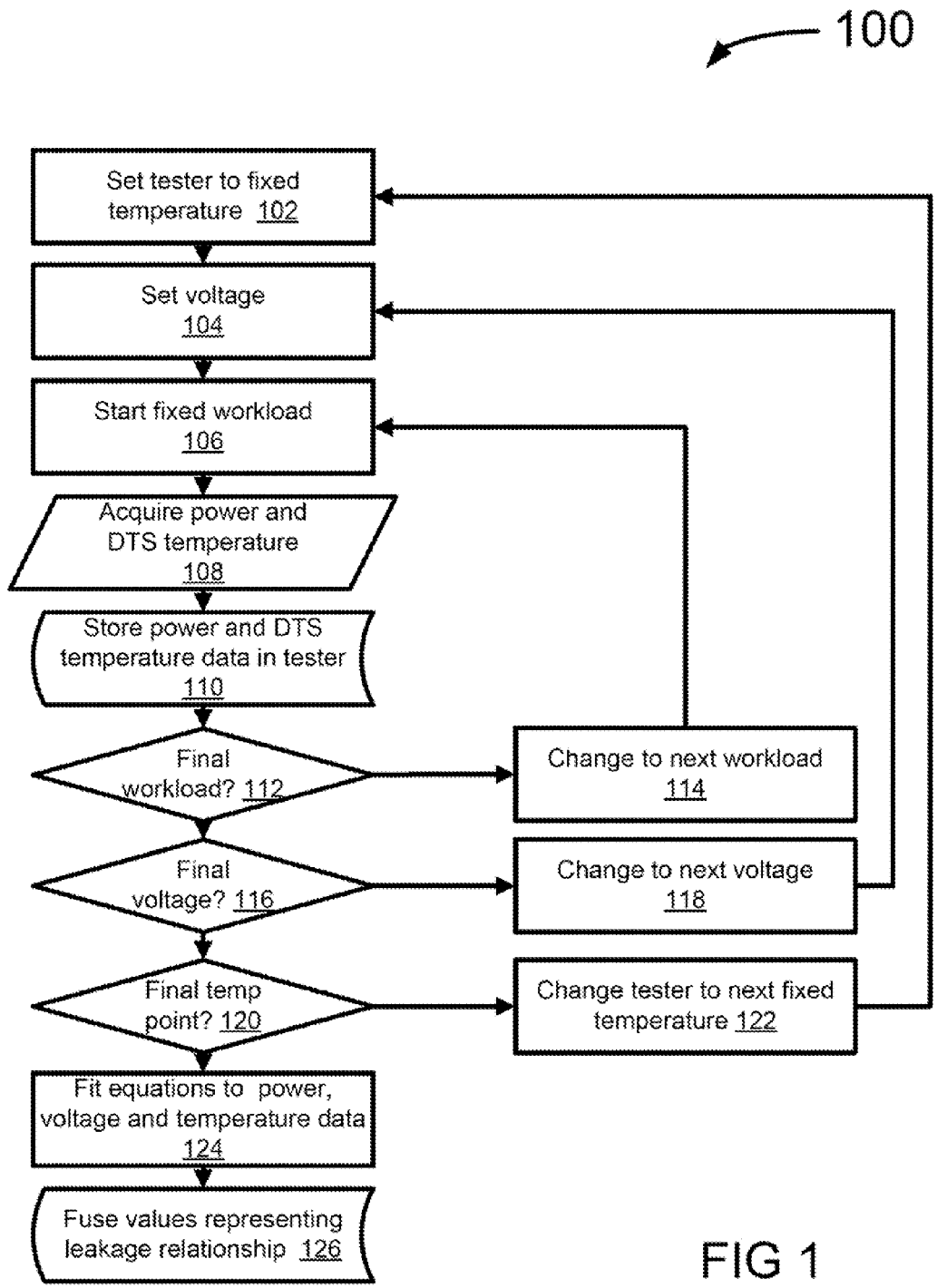
FIG. 1 illustrates a system and/or flow according to some embodiments of the inventions.

Some embodiments of the inventions relate to thermal optimization of processor and fan speed.

In some embodiments a processor is adapted to store a relationship of power as a function of temperature and voltage, wherein the stored relationship data is to be used for managing power in a system including the processor.

Power and thermal characterization of server and other computer systems has demonstrated that there are two main contributors to power consumption increases and temperature increases. In order to maintain all components within their specifications, fans increase in speed. Additionally, as processor die temperature increases, processor leakage increases. In order to enable a platform to set optimal fan speeds with minimal wall power required, the computing platform must have knowledge of the temperature vs. leakage characteristic of the installed processor and balance that against the increase in fan power as fan speeds increase.

A quantity of processors can be characterized to understand and/or quantify power vs. temperature and/or leakage vs. temperature characteristics for a given processor type. As a result of knowing this relationship, the system can then optimize fan speed to enable a lower power requirement (for example, lower wall power). This is not necessarily the lowest possible power required (lowest wall power), however, because the exact characteristics of each individual processor are not used. This characterization does not enable optimization for an individual processor, but rather optimizes merely for a particular processor type. As a result, wall power can be somewhat optimized but is not fully optimized on an individual processor basis. In such an implementation, the processor does not participate in optimizing the system's fan speeds, for example, based on processor and system characteristics. Any optimization must be performed using the system's firmware. That optimization is not based on the populated processor, just the general processor type (and/or processor SKU) characteristics.

Currently available systems require a computing platform to either pre-characterize a number of processors to understand temperature-leakage trends for a processor type (and/or processor SKU), and use them in a thermal control algorithm. This is not optimal because it does not enable use of the exact characteristics for the particular processor under consideration.

In some embodiments, power characteristics of an individual processor are evaluated under conditions where voltage (V), temperature (T), and/or application (AR) are known. According to some embodiments, a processor's die temperature such as a Digital Thermal Sensor (DTS) temperature and power are recorded for different fixed values of voltage (V), test temperature (T), and application. Based on this characterization, the DTS temperature-power relationship at various voltage settings of the processor is calculated and/or known, and is stored into the processor. For example, according to some embodiments the processor power as a function of temperature and voltage is fused in the processor part. This is then used according to some embodiments, for example, by a platform thermal management module that manages the system thermal response to the processor cooling requirements.

In this manner, according to some embodiments, the data necessary for the computing system to optimize wall power on specific populated processors is exposed to the platform for power optimization (for example, for wall power optimization).

FIG. 1 illustrates a system and/or flow 100 according to some embodiments. In some embodiments system and/or flow 100 at 102 sets a tester to a fixed temperature. Then a voltage is set at 104. The fixed workload (and/or application) is then started at 106. A power and Digital Thermal Sensor temperature for the current temperature, voltage, and workload are acquired at 108. The power and DTS temperature data are stored in the tester at 110. At 112 a determination is made as to whether the final workload has been completed. If the final workload has not been completed at 112, a change is made to the next workload at 114, and flow returns to 106 where the next workload is started. If the final workload has been completed at 112, then a determination is made at 116 as to whether the final voltage has been completed. If the final voltage has not been completed at 116, a change is made to the next voltage at 118, and flow returns to 104 where the next voltage is set. If the final voltage has been completed at 116, then a determination is made at 120 as to whether the final temperature point has been completed. If the final temperature point has not been completed at 120, a change is made to change the tester to the next fixed temperature at 122, and flow returns to 102 where the tester is set to the next fixed temperature. If the final voltage has been completed at 120, then equations are fit to the power, voltage and temperature data at 124. Values representing the DTS temperature power relationship (and/or leakage relationship) are then stored in the processor (for example, fused in the processor part) at 126. According to some embodiments, the stored values are used during operation of the computer system including the processor to manage the system thermal response to the processor's cooling requirements. In some embodiments, this is performed using platform thermal management.

In some embodiments a processor enables a customer to optimize wall power based on characteristics of that processor (for example, a populated processor).

According to some embodiments, a processor enables platform power optimization. According to some embodiments, a processor included in any computer system enables platform power optimization. In some embodiments, a processor included in a computer system used in a data center (for example, a server computer system) enables power optimization. In some embodiments, a processor included in a laptop computer system enables power optimization. In some embodiments, a processor included in a computer system that derives power from a wall power source (and/or an Alternating Current or AC power source) enables power optimization. In some embodiments, a processor included in a computer system that derives power from a battery power source (and/or a Direct Current or DC power source) enables power optimization.

It is noted that FIG. 1 illustrates at 126 the storage of values representing the DTS temperature power relationship (and/or leakage relationship) in the processor (for example, fused in the processor part). According to some embodiments, the stored values are used during operation of the computer system including the processor to manage the system thermal response to the processor's cooling requirements. It is noted that according to some embodiments, instead of and/or in addition to storing the values in the processor, the values are used to enable fan speed optimization. This fan speed optimization can occur within the processor and/or outside the processor (for example, using platform thermal management.

Figure 2:
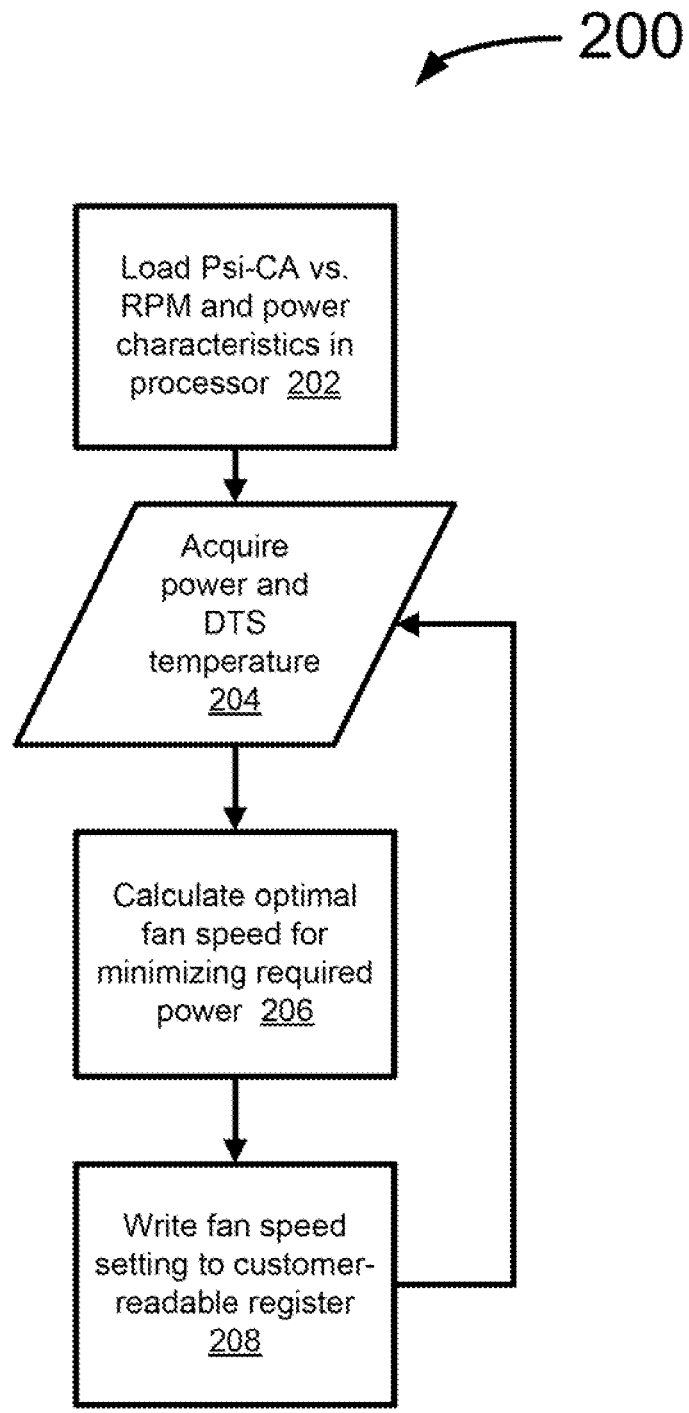
FIG. 2 illustrates a system and/or flow according to some embodiments of the inventions.

FIG. 2 illustrates a system and/or flow 200 according to some embodiments. System and/or flow 200 are performed in some embodiments inside the processor, outside the processor, and/or using platform thermal management. At 202 processor thermal resistance denoted by $\Psi_{CA}$ (Thermal resistance in degrees C per watt for the temperature difference between the processor case temperature and the local ambient air temperature) vs. fan RPM (Revolutions Per Minute) and fan power data is loaded in the processor. Processor power and DTS temperature values are acquired at 204. At 206 the optimal fan speed is calculated for power optimization and/or minimizing power (and/or minimizing wall power). According to some embodiments this calculation includes both the power/thermal information along with the processor or CPU (Central Processing Unit) power/temperature characteristics. At 208 a fan speed setting is written to a customer-readable register (for example, a register in the processor).

Figure 3:
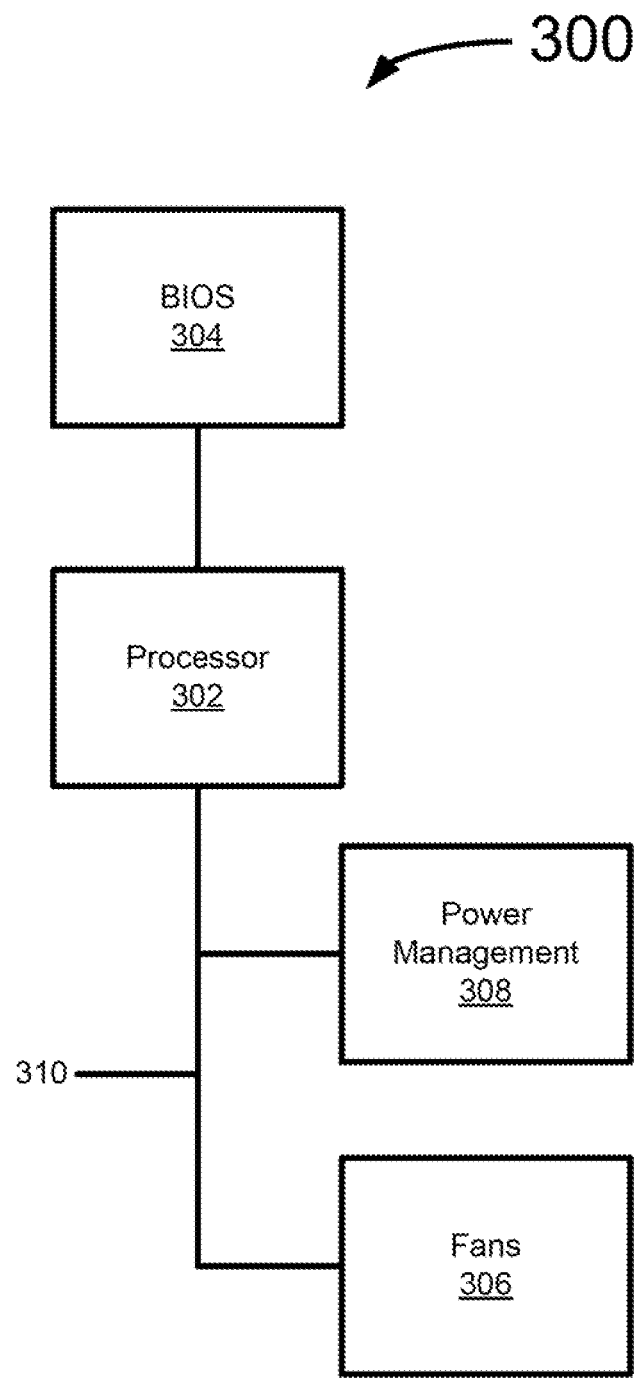
FIG. 3 illustrates a system according to some embodiments of the inventions.

FIG. 3 illustrates a system 300 according to some embodiments. In some embodiments, system 300 is a computer system, a server system, a desktop system, a data center system, a portable device system, a tablet system, a cell phone system, and/or a laptop system, for example. In some embodiments, system 300 includes a processor (and/or CPU) 302, a Basic Input/Output System (BIOS) 304, one or more fans (and/or a fan system) 306, power management 308 (for example, power management firmware, server management, server management firmware, a chipset, an I/O Controller Hub or ICH, and/or a Platforms Controller Hub or PCH), and an interface 310 (for example, a bus, a communication interface and/or a Platform Environmental Control Interface, PECI, and/or PECI bus). Interface 310 is illustrated in FIG. 3 as a common interface between the processor 302, fans 306, and server management 308. However, in some embodiments separate interfaces between these devices are used.

During BIOS 304 initialization, computer system 300 loads in processor 302 fan speed and/or power vs. thermal (for example, as described in reference to FIG. 2). Using this data and the processor's power vs. temperature characteristics, the processor 302 and/or power management 308 determine an optimal fan speed for one or more of the fans 306 (for example, one or more fans in a processor fan zone). This value is exposed to the platform over interface 310 (and/or over PECI) and used as a lower fan speed target based on system and processor conditions.

Figure 4:
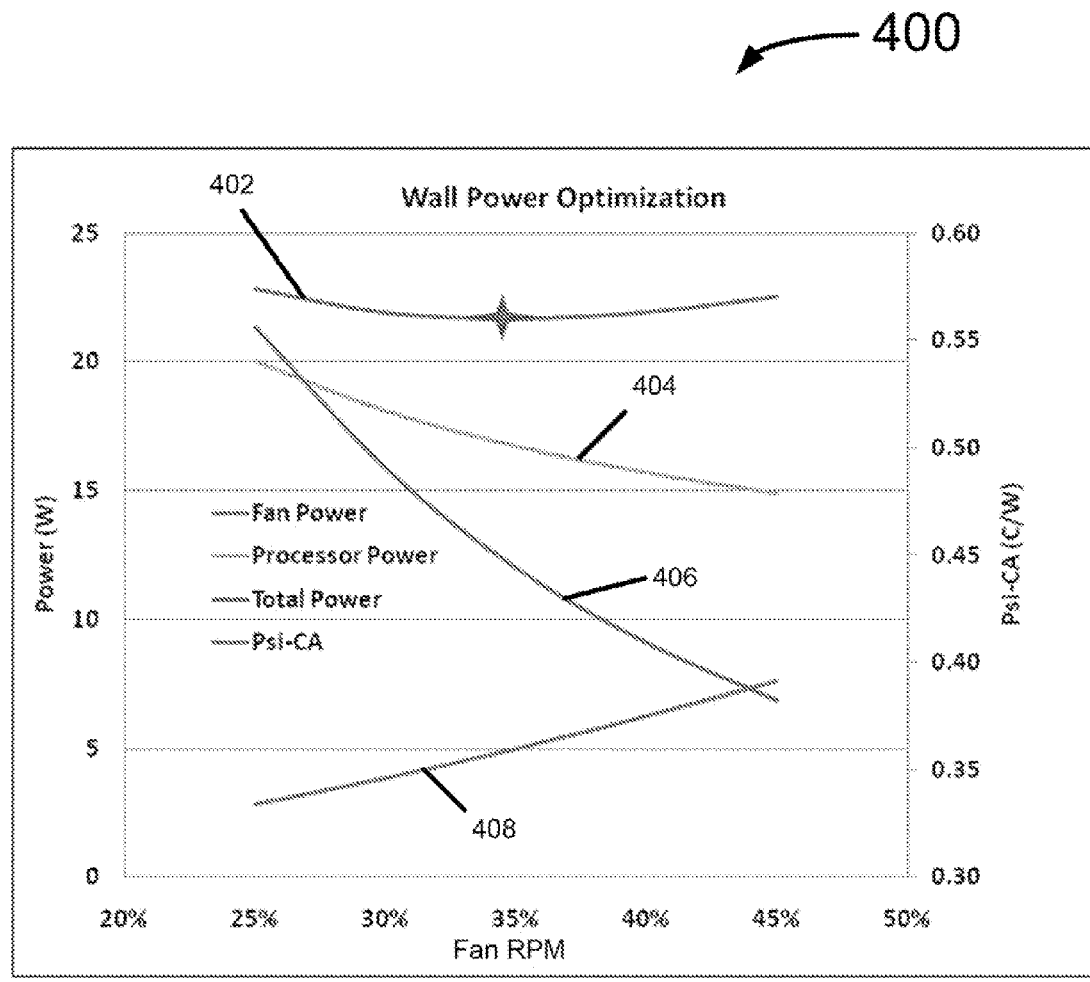
FIG. 4 illustrates a chart according to some embodiments of the inventions.

FIG. 4 illustrates a chart 400 according to some embodiments. In some embodiments, chart 400 illustrates power (in Watts) and Psi-CA (in temperature/Watts or C/Watts) vs. Fan PWM (Pulse Width Modulation). Chart 400 includes total power 402, processor power 404, Psi-CA 406, and fan power 408 waveforms. Chart 400 illustrates how fan speed settings may be optimized according to some embodiments.

In some embodiments power management and/or server management firmware (for example, power management 308) determine whether a calculated value derived as set forth above (for example, in view of the description set forth herein and/or chart 400) can be used based on other components in the fan zone. For example, according to some embodiments, other components with sensors may force a higher fan speed than that required for the processor.

According to some embodiments, a processor uses system characteristics and its own power vs. temperature characteristics to find an optimal fan speed to minimize power use (for example, wall power use and/or battery power use according to some embodiments). In some embodiments, the optimization functionality resides in the processor and is based upon the processor's own characteristics.

According to some embodiments, a customer can optimize power use based on characteristics of the populated processor. According to some embodiments, fan speed optimization is enabled in silicon depending upon silicon characteristics (for example, enabled in the processor silicon).

According to some embodiments, the computer system delivers processor thermal characteristics to the processor and the processor delivers back the optimal fan speed setting.

Although some embodiments have been described herein as being implemented in a particular manner, according to some embodiments these particular implementations may not be required. For example, some embodiments have been discussed herein as optimizing fan speed. However, some embodiments do not relate to fan speed. For example, in some embodiments any cooling may be implemented (for example, in some embodiments, a pump speed in a liquid cooling system is optimized).

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein, For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   a processor that stores a first relationship of processor power as a function of temperature and voltage, and stores a second relationship of fan power and fan speed as a function of processor thermal resistance; and
   a power management device to control a speed of one or more fans based on the first relationship and the second relationship to reduce power consumption of the apparatus by balancing fan power consumption and processor power consumption.

2. The apparatus of claim 1, wherein the processor is adapted to store the first relationship in response to testing of the processor in a plurality of voltages, temperatures, and/or applications.

3. The apparatus of claim 1, wherein the temperature in the first relationship corresponds to a temperature measured by a Digital Thermal Sensor associated with the processor.

4. The apparatus of claim 1, wherein the processor power relates to a leakage of the processor.

5. The apparatus of claim 1, the processor adapted to deliver a fan speed value to the system for control purposes.

6. A method comprising:
   calculating a first relationship of processor power as a function of temperature and voltage;
   calculating a second relationship of fan power and fan speed as a function of processor thermal resistance;
   storing the first relationship and the second relationship to a processor in a system; and
   controlling a speed of one or more fans based on the first relationship and the second relationship to reduce power consumption of the system by balancing fan power consumption and processor power consumption.

7. The method of claim 6, further comprising:
   testing the processor in a plurality of voltages, temperatures, and/or applications; and
   characterizing the first relationship in response to the testing.

8. The method of claim 6, further comprising:
   receiving a temperature reading from a Digital Thermal Sensor associated with the processor and using the received temperature reading from the Digital Thermal Sensor as the temperature in the first relationship.

9. The method of claim 6, wherein the processor power relates to a leakage of the processor.

10. The method of claim 6, further comprising delivering a fan speed value to the system for control purposes.

11. A method comprising:
    receiving a first relationship of processor power as a function of temperature and voltage from a processor in a system;
    receiving a second relationship of fan power and fan speed as a function of processor thermal resistance from the processor; and
    controlling a speed of one or more fans based on the first relationship and the second relationship to reduce power consumption of the system by balancing fan power consumption and processor power consumption.

12. The method of claim 11, wherein the first relationship corresponds to a testing of the processor in a plurality of voltages, temperatures, and/or applications.

13. The method of claim 11, wherein the processor power, relates to a leakage of the processor.

14. The method of claim 11, further comprising delivering a fan speed value to the system for control purposes.

15. An apparatus comprising:
- a power management device to receive a first relationship of processor power as a function of temperature and voltage from a processor;
- the power management device to receive a second relationship of fan power and fan speed as a function of processor thermal resistance from the processor; and
- the power management device to control a speed of one or more fans based on the first relationship and the second relationship to reduce power consumption of the apparatus by balancing fan power consumption and processor power consumption.

16. The apparatus of claim 15, wherein the first relationship corresponds to a testing of the processor in a plurality of voltages, temperatures, and/or applications.

17. The apparatus of claim 15, wherein the temperature in the first relationship corresponds to a temperature measured from a Digital Thermal Sensor associated with the processor.

18. The apparatus of claim 15, wherein the processor power relates to a leakage of the processor.

19. The apparatus of claim 15, the processor adapted to deliver a fan speed value to the system for control purposes.

* * * * *